United States Patent [19]

Georgiev et al.

[11] 4,405,084
[45] Sep. 20, 1983

[54] HYDRO-PNEUMATIC ACCUMULATOR FOR IMPULSE SPRINKLING

[75] Inventors: Vesselin Y. Georgiev; Vladimir S. Mednikarov, both of Sofia, Bulgaria

[73] Assignee: Institute Po Mechanika I Biomechanika, Sofia, Bulgaria

[21] Appl. No.: 180,381

[22] Filed: Aug. 21, 1980

[30] Foreign Application Priority Data

Aug. 21, 1979 [BG] Bulgaria ................................ 44 712

[51] Int. Cl.³ ............................................. B05B 1/08
[52] U.S. Cl. ...................................... 239/99; 137/510; 239/101
[58] Field of Search ............ 239/96, 99, 101, 570-572; 222/373, 444-446, 449, 450; 137/204, 209, 624.13, 159, 510, 156; 251/61.1; 138/26

[56] References Cited

U.S. PATENT DOCUMENTS 3,659,625  5/1972  Coiner et al. .................. 137/510 X
4,270,697  6/1981  Georgiev et al. ..................... 239/99

FOREIGN PATENT DOCUMENTS 24419  6/1977  Bulgaria .
26011  2/1979  Bulgaria .
1044496 11/1958  Fed. Rep. of Germany ........ 239/99
1092381  4/1955  France ................................. 138/26
20922  6/1979  Iran .

*Primary Examiner*—Andres Kashnikow
*Assistant Examiner*—Michael J. Forman

[57] ABSTRACT

Apparatus for impulse spraying. A float valve is disposed at the lowest end of a liquid/gas accumulator which is connected via a connecting pipe having the float valve interposed therein to a hollow member having a vertically divided space to the upper end of which an outflow pipe leading to a sprinkler is connected. A water distribution pipe leading from a water supplying conduit is attached to the lower end of the divided space. A selectively operated shut-off valve in the hollow member is interposed between the outflow pipe and the connecting pipe, the shut-off valve functioning to shut off the outflow pipe when the water pressure in the upper end of the divided space in the hollow member is lower than that in the lower end of such divided space, and to open the outflow pipe when the pressure in the upper end of the divided space exceeds the pressure in the lower end of the divided space.

4 Claims, 3 Drawing Figures

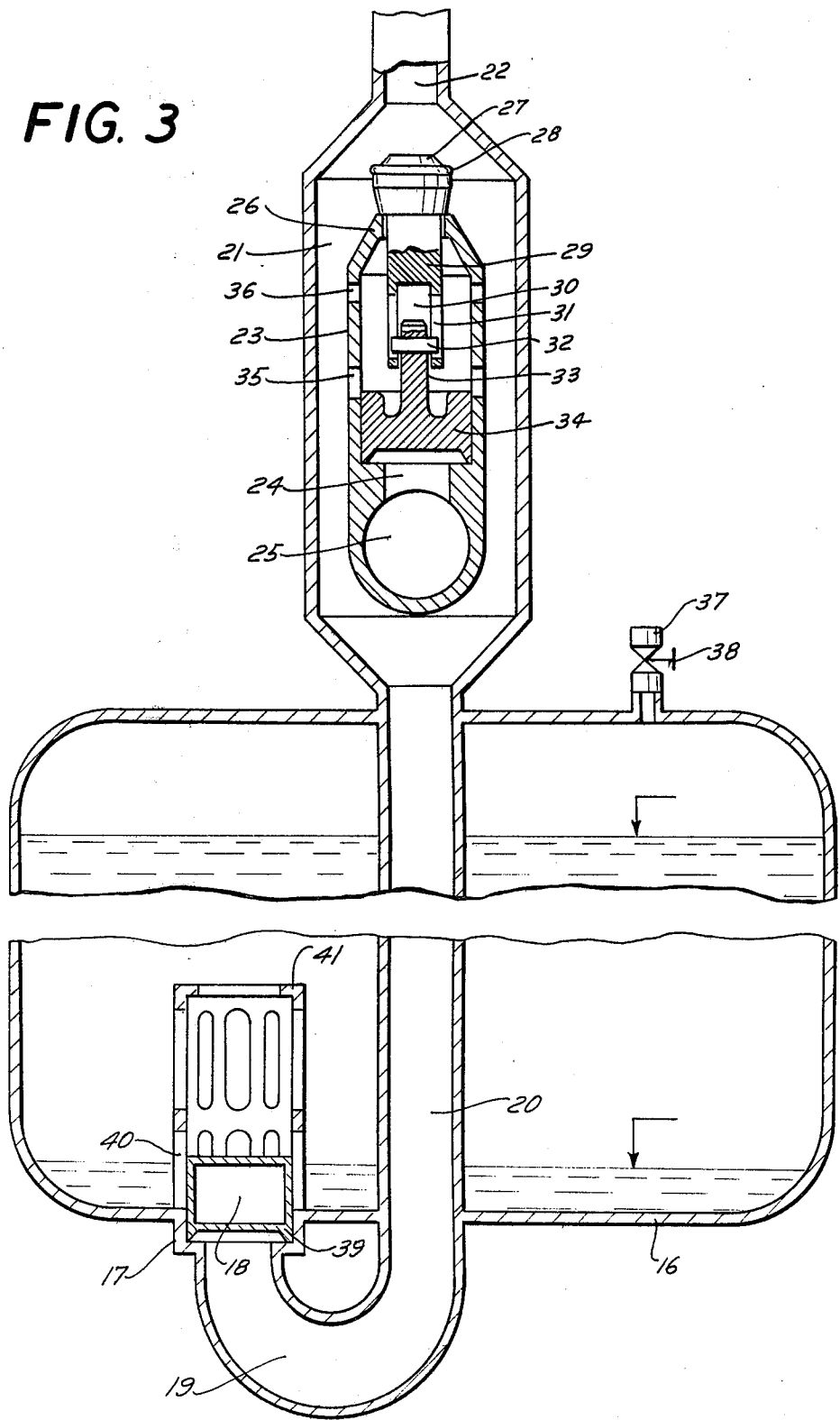

HYDRO-PNEUMATIC ACCUMULATOR FOR IMPULSE SPRINKLING

This invention refers to a hydro-pneumatic accumulator for impulse sprinkling; such accumulator can be used in agriculture for watering plants.

A known device disclosed in Bulgarian Author's Certificate No. 24,419 for impulse sprinkling includes a liquid/gas accumulator with a float return check valve, input and output pipelines, and a control valve. The control valve has a piston with a stopper, and is placed in the inside chamber of the accumulator, the valve opening and closing the input and output pipelines, respectively, when there are signals for increased or reduced water pressure in the distribution pipelines of the sprinkling system.

Among the disadvantages of the known device are the flow of water from the liquid/gas accumulator through the control valve back into the distribution pipeline during the initial moments of the signal for reduced pressure; this reduces the reliability of the functioning of the valve and requires the utilization of a distribution pipeline with a larger diameter than the minimum diameter which is possible, as well as the possibility of air from the water distributing network entering into the liquid/gas accumulator, thus changing the sub-pressure of the air in the accumulator, which has been established beforehand.

The object of the invention is to provide a hydro-pneumatic accumulator for impulse sprinkling in which the possibility of water flowing from the liquid/gas compression accumulator back into the distribution pipeline when the water pressure is reduced is eliminated, and to insure maximum reliability in complying with the control impulses for increased and reduced pressure in the distribution pipeline. The accumulator of the invention also eliminates the possibility of air entering the liquid/gas accumulator together with the water flowing along the pipeline system.

These results are achieved by the hydro-pneumatic accumulator for impulse sprinkling in accordance with the invention. The float valve is situated at the lowest point of the liquid/gas accumulator, which is connected via a connecting pipe to a chamber to the upper end of which the outflow pipe is joined, the water distribution pipe being attached at the bottom end of the chamber through a pipe joint. In one embodiment the chamber is divided by a horizontally placed membrane, the space above the membrane being connected to the connecting pipeline; the space beneath the membrane is connected to the water distributing pipeline system. The latter is connected to the connecting pipeline through the input pipeline at a place between the float valve and the chamber. The lower end of the outflow pipe, which is situated above the membrane, is usually closed by the membrane. The water distribution pipeline is situated above the connection pipeline, while the input pipeline, connecting the water distribution pipeline to the connection piping, has vertical and horizontal segments, the return check valve being installed on the horizontal segment. The connecting piping is inclined, the end of which is towards the chamber is situated higher than the end towards the float valve of the liquid/gas accumulator.

In a second embodiment of the hydro-pneumatic accumulator of the invention, the connection piping is installed along the axis of the liquid/gas accumulator and is isolated from the latter, the upper end of the connection piping ending with the accumulator. Inside, along the axis of the accumulator there is affixed a cylinder, the lower end of the cylinder being connected through the input opening with the water distribution pipeline which passes through the walls of the accumulator perpendicularly to the axis thereof. The cylinder ends at its upper end with a guide cone, into which opening, along the axis of the outlet pipe, a floating plug with ring fitting is installed. In the lower end of the plug there is a recess with two side slots, through which the plug is connected to a pin affixed in a recess in the piston. The diameter of the piston is greater than the diameter of the inlet to the cylinder, above which there are drilled openings connecting the supply pipe with the chamber. The outer diameter of the cylinder is smaller than the inside diameter of the chamber, while the diameter of the plug is greater than the diameter of the outlet pipe and smaller than the diameter of the piston. The vertical movement of the piston is greater than the vertical movement of the plug plus the vertical movement of the pin in the side openings in the plug.

The advantages of the hydro-pneumatic accumulator for impulse sprinkling of the invention are that the reversed water flow from the liquid/gas accumulator towards the supply pipe is impossible with signals of reduced pressure: this insures maximum reliability when complying with control signals for reduced pressure, and leads to reduction of the pressure in the minimum diameter of the supply pipeline. Furthermore, in the liquid/gas accumulator no air can enter together with the water along the water supplying pipelines.

Preferred embodiments of the invention are shown in the attached drawings, wherein:

FIG. 3 is a view in vertical section along the axis of a second embodiment of the hydro-pneumatic accumulator in accordance with the invention.

Figure 1:
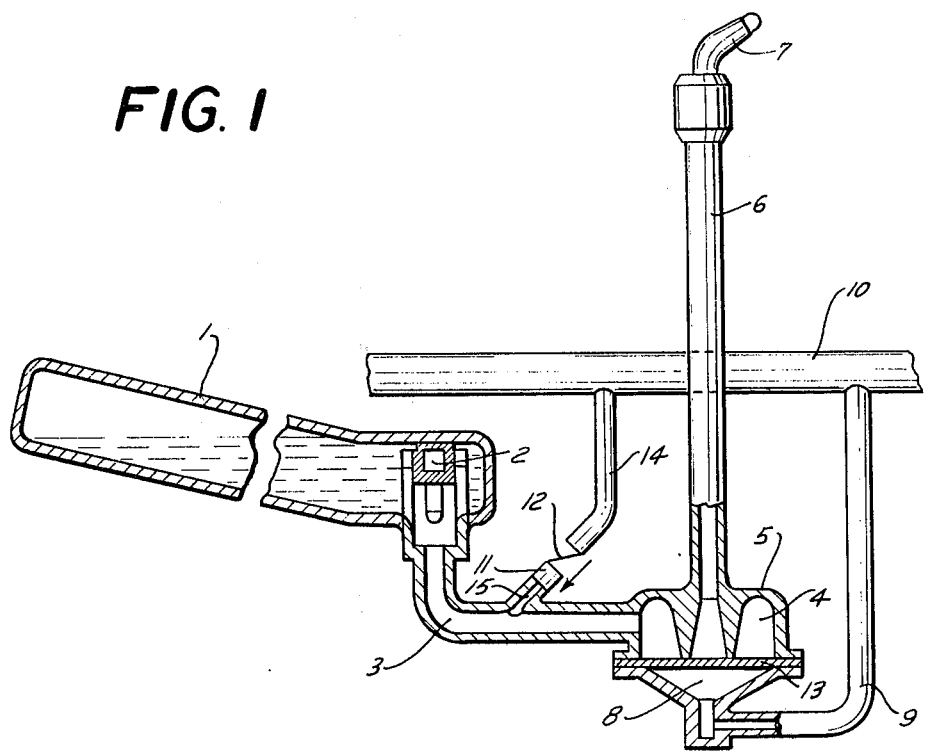
FIG. 1 is a view partially in side elevation and partially in vertical section of a first embodiment of the hydro-pneumatic accumulator for impulse sprinkling upon receipt of a signal for increased water pressure in the water supplying pipeline.
Figure 2:
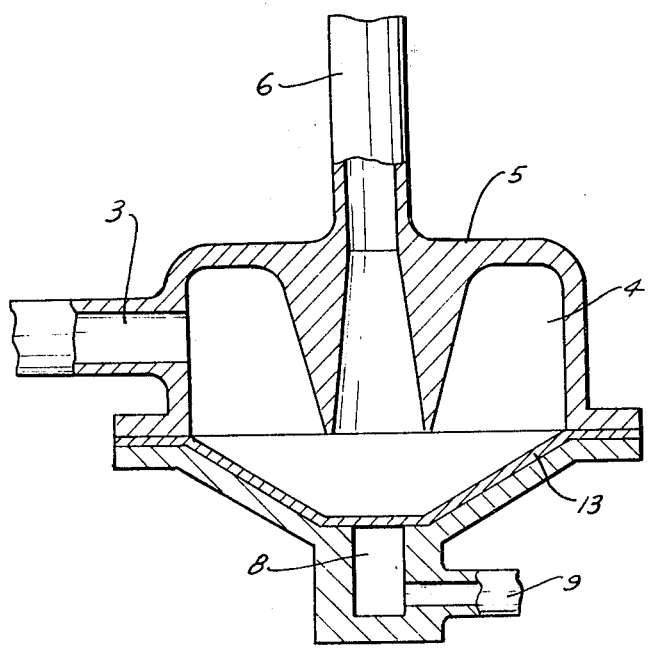
FIG. 2 is a view in section along the axis of the chamber showing the accumulator upon receipt of a signal for reduction of the water pressure in the water supplying pipeline.

Turning first to FIGS. 1 and 2, the hydro-pneumatic compression accumulator for impulse sprinkling there shown consists of a liquid/gas compression accumulator 1, into which there extends a float valve 2, placed vertically at the lowest point of the accumulator 1. The accumulator 1 via valve 2 and a connecting pipe 3 is connected to the space 4 above a membrane or diaphragm 13 of a membrane chamber 5. Vertically along the axis of the chamber 5 there is installed an outlet pipeline 6 which terminates in a sprinkling device 7. The space 8 beneath the membrane 4 is connected via a lateral pipe 9 to a water supplying pipeline 10. The water-supplying pipeline 10 is connected to the connecting pipe 3 through an inlet pipe 11 at a location between the float valve 2 and the upper part of the membrane chamber 5 above the membrane. The bottom end of the outlet pipe 6, which is placed in the upper part 4 of the membrane chamber 5, is usually closed by the membrane 13. The water-supplying pipeline 10 is situated above the connecting pipe 3, while the inlet pipe 11, connecting the supplying pipeline 10 with the connecting pipe 3, has vertical and inclined parts 14 and 15, respectively, a return check valve 12 being installed between parts 14 and 15 of pipe 11. The connecting pipe 3 is inclined or bent, the end toward the chamber 5 being lower than the end toward the float valve 2 of the liquid/gas compression accumulator 1.

In the embodiment shown in FIG. 3, in the hydro-pneumatic accumulator 16 there is disposed normal to such horizontal bottom of the liquid/gas compression accumulator and parallel to its axis there is disposed a vertical guide chamber 17 for a float valve 18, the opening under which is connected via a U-shaped conduit 19 to a vertical connecting pipe 20, which is disposed vertically along the axis of the liquid/gas compression accumulator 16 and is isolated from the latter. Chamber 17 has a vertical inner side wall 39 through which there extends a plurality of vertical apertures or slots 40. A radially inwardly extending flange 41 at the top of the chamber prevents the escape of the float 18 therefrom. The connecting pipe 20 extends upwardly through the accumulator 16 to a chamber 21 disposed above the top of liquid/gas compression accumulator 16. Chamber 21 is connected at its upper end with an outlet leading to a sprinkling device, not shown. Inside chamber 21 and coaxial therewith therewith there is affixed a cylinder 23, cylinder 23 being connected at its bottom end via an inlet 24 to a horizontal water-supplying pipe 25. Pipe 25 passes through, and is sealed to the walls of the chamber 21.

The cylinder 23 ends at its top with an upwardly and radially inwardly converging frusto-conical portion 26, the upper end of portion 26 constituting an annular valve seat. A movable valve element is disposed with its stem 29 extending through the valve seat, the upper end of the stem 29 being in the form of a plug 27 disposed above the valve seat and having an annular sealing member 28 thereon which selectively sealingly cooperates with the valve seat on the part 26. The lower end of the stem 29 has an axially extending recess 30 therein, the side wall of the lower end of the valve stem having two oppositely disposed vertically elongated slots 31 therethrough. A piston 34 is reciprocable vertically within the cylinder 23, the piston having a piston rod coaxial therewith projecting vertically within the recess 30. A cross pin 32 extending through the upper end of the piston rod 33 has the opposite ends thereof slidably disposed in the slots 31 in the stem 29. It will thus be seen that when water under pressure flows from pipe 25 through aperture 24 into the lower end of the cylinder 23, the piston 34 is forced upwardly within the cylinder. The valve composed of the fixed valve seat at the upper end of part 26 and plug 27 with sealing means 28 thereon opens only when the piston 34 has risen sufficiently for the piston rod 33, acting through the cross pin 32 and the upper ends of the slot 31, has forced the member 27, 28, 29 upwardly into a valve-open position.

The diameter of the piston 34 is greater than the diameter of the inlet 24 to the cylinder 23. In the walls of the cylinder 23 there are provided a number of lower apertures 35 and upper apertures 36 connecting the interior of the cylinder 23 with chamber 21 and thus with the outlet pipe 22. In the position of the piston 34 shown in FIG. 3 both the apertures 35 and 36 are open, thereby permitting an equalization of pressure above and below the piston 34. When the piston 34 has risen sufficiently, it blocks the apertures 35. The outer diameter of the cylinder 23 is smaller than the inside diameter of the chamber 21, while the diameter of the plug 27, 28 is greater than the diameter of the outlet pipe 22 and is smaller than the diameter of the piston 34. The vertical movement of the piston 34 is greater than the sum of the vertical movement of the plug 27, 28 and the vertical movement of the pin 32 in the apertures 31 and the stem 29 of the plug 27, 28.

The hydro-pneumatic accumulator of FIGS. 1 and 2 functions as follows: In advance in the liquid/gas compression accumulator 1, which is designed with the shape of a pipe and is installed inclined in respect to the horizontal plane, air is pumped until a pressure is reached which is equal to the lowest allowable limit of the pressure for normal functioning of the sprinkling device 7. At a signal for increased pressure, the water from the supplying pipeline 10 passes through the lateral pipe 9 into the chamber 8 under the membrane 13 and through the inlet pipe 11, the return check valve 12 and the connecting pipe 3 - into the chamber 4 above the membrane 13 and simultaneously in the liquid/gas compression accumulator 1. Since the force acting on the membrane 13 from the chamber 8 beneath the membrane is greater than the pressure in the chamber 4, the membrane 13 closes the outlet pipe 6 and water can not flow toward the sprinkling device 7. At a signal for reduced pressure of the water in the supplying pipeline 10, the return check valve 12 closes the inlet pipe 11, while the membrane 13 opens the outlet pipe 6. With that there begins the process of sprinkling with the water accumulated in the liquid/gas compression accumulator 1; sprinkling stops once the water level reaches the float valve 2 in the accumulator 1.

The embodiment of the hydro-pneumatic accumulator shown in FIG. 3 functions as follows: The liquid/gas compression accumulator 16 charged in advance through a hose-end fitting 37 and a valve 38 with a small amount of water, has air pumped thereinto up to a specific pressure, which corresponds to the lower allowable limit of the pressure which insures normal functioning of the sprinkling device (not shown) which is connected to the upper end of the outlet pipe 22. At a signal for increased pressure in the water supplying pipeline 25, the water from the latter enters the cylinder 23 through the inlet 24. The piston 34 moves upwardly and through the pin 32 raises the plug 27, 28 which closes the outlet pipe 22. At the same time, the water enters into the chamber 21 below the piston 34 through the apertures 35 in the walls of the cylinder 23, the connecting pipe 20 and the conduit 19 and leaves the upper part of the cylinder 23 through openings 36. When the pressure in the connecting pipe 20 becomes equally to or becomes greater than the pressure of the air pumped in the accumulator 16, the float valve 18 is raised to engage stop flange 41 and the water enters the liquid/gas compression accumulator 16 through the apertures 40 and the guide chamber 17, where it begins to accumulate as a result of the air being compressed in the upper part of the accumulator 16. When the pressure in the supplying pipeline 25 becomes equal to that in the accumulator 16, the process of water accumulation stops and under the action of its own weight and of water entering the cylinder 23 above the piston 34 through openings 36 the piston 34 moves downwardly until the pin 32 comes to rest on the bottom end of the apertures 31. During the motion the piston 34 opens the apertures 35.

After a signal for reduced pressure in the pipeline 25, due to the pressure difference under and above the piston spaces in the cylinder 25, the piston 34 moves downwards, and, through the pin 32, pulls the plug 27, 28 thus opening the outlet pipe 22. The water accumulated in the liquid/gas compression accumulator 16 under the action of the expanding air is pushed in an impulse towards the outlet pipe 22. When the level in the former comes close to the bottom of the accumulator 16, the float valve 18 moves downwards in the guide chamber 17 and closes the outlet from the accumulator 16. This ends one cycle of the hydro-pneumatic accumulator.

If together with the water from the supplying pipeline 25, there comes air, the latter is separated by flowing through holes 36 at the upper part of the chamber 21, and after the signal for reduced pressure, such air is pushed into the atmosphere through the sprinkling device on pipe 22, and thus it can not enter the accumulator 16.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. Apparatus for impulse spraying, comprising a hydro-pneumatic accumulator, a connecting pipe having a first end connected to the lowest point of the accumulator, a float valve in the accumulator interposed between the space within the accumulator and the first end of the connecting pipe to prevent the flow of water from the accumulator into the connecting pipe when the water level in the accumulator drops to the predetermined level, a water supplying conduit, conduit means including a pack flow-preventing check valve for feeding water from the water supplying conduit into the accumulator, an outlet pipe having a sprinkler on its outer end, a selectively operated shut-off valve interposed between the second end of the connecting pipe and the inlet end of the outlet pipe, and means responsive to changes of water pressure in the water supplying conduit for controlling the shut-off valve to open the shut-off valve when such water pressure falls below a predetermined desired value, and to close the shut-off valve when such water pressure exceeds a predetermined desired value, the connecting pipe being isolated from the liquid/gas compression accumulator, the upper end of the connecting pipe terminating in a chamber inside which there is affixed the conduit means, the conduit means comprising a cylinder, the cylinder being connected from below, through an inlet, to the water supplying conduit, the water supplying conduit passing through the walls of the chamber, and the conduit means ending at its upper end in a guide cone having a valve seat around an axial opening therethrough, a vertically reciprocable valve element having a stem at its lower end passing through the valve seat, a recess with two opposed apertures in the stem by means of which the valve element is connected to a cross pin through the piston rod of a piston which reciprocates in the cylinder, the diameter of the piston being greater than the diameter of the inlet to the cylinder, at a predetermined distance above the inlet to the cylinder in the walls of the cylinder there being apertures connecting the water supplying conduit with the space in the cylinder beneath the piston.

2. Apparatus according to claim 1, wherein the inside diameter of the cylinder is smaller than the outer diameter of the chamber.

3. Apparatus according to claim 1, wherein the effective diameter of the movable valve element is greater than the diameter of the piston.

4. Apparatus according to claim 1, wherein the vertical movement of the piston is greater than the vertical movement of the movable valve element.

* * * * *